United States Patent [19]
Sorin et al.

[11] Patent Number: 5,291,267
[45] Date of Patent: Mar. 1, 1994

[54] OPTICAL LOW-COHERENCE REFLECTOMETRY USING OPTICAL AMPLIFICATION

[75] Inventors: Wayne V. Sorin, Mountain View; Douglas M. Baney, Menlo Park, both of Calif.

[73] Assignee: Hewlett-Packard Company, Palo Alto, Calif.

[21] Appl. No.: 823,936

[22] Filed: Jan. 22, 1992

[51] Int. Cl.⁵ .............................. G01B 9/02
[52] U.S. Cl. ..................... 356/345; 356/73; 385/12
[58] Field of Search ........... 250/227.19, 227.27; 372/6, 1, 39, 69; 385/12; 356/350, 345, 349, 359, 73.1

[56] References Cited

U.S. PATENT DOCUMENTS 5,013,907 5/1991 Bateyan .................. 250/227.12
5,106,193 4/1992 Fesler et al. ................... 372/6

FOREIGN PATENT DOCUMENTS

WO90/11484 3/0990 World Int. Prop. O. .
WO/04655 8/1991 World Int. Prop. O. .

OTHER PUBLICATIONS

"Optical Coherence-Domain Reflectometry: A New Optical Evaluation Technique", Robert C. Youngquist, Sally Carr, and D. E. N. Davies, *Optics Letters*, vol. 12, No. 3, Mar. 1987.

"New Measurement System for Fault Location in Optical Waveguide Devices Based on an Interferometric Technique", Kazumasa Takada, Itaru Yokohama, Kazumori Chida, and Juichi Noda, *Applied Optics*, vol. 26, No. 9, May 1, 1987.

"Guided-Wave Reflectormety With Micrometer Resolution", B. L. Danielson and C. D. Whittenberg, *Applied Optics*, vol. 26, No. 14, Jul. 15, 1987.

*Primary Examiner*—Samuel A. Turner
*Assistant Examiner*—Robert Kim

[57] ABSTRACT

An improved low-coherence reflectometer is disclosed for use in measuring Rayleigh backscattering. The invention utilizes an optical amplifier to amplify the backscattered light thereby reducing the measurement times. The preferred optical amplifier is a diode-pumped superfluorescent fiber which acts both as the amplifier and the low-coherence light source. Reductions in signal averaging times of a factor of 100 are achieved by the use of the amplifier.

6 Claims, 5 Drawing Sheets

OPTICAL LOW-COHERENCE REFLECTOMETRY USING OPTICAL AMPLIFICATION

FIELD OF THE INVENTION

The present invention relates to optical measurements, and more particularly, to optical reflectometry.

BACKGROUND OF THE INVENTION

The increased use of optical components in communication and data processing systems has created an increased need for a method for measuring optical in homogeneities in optical components. For example, in fiber optic based communication systems there is a need to measure splice losses and the location of non-reflecting fiber breaks. Similarly, there is a need for a methodology for characterizing optical components such as silica based optical planar wave guides and LiNbO3 wave guides.

One method for analyzing in homogeneties in optical fibers is optical time domain reflectometry. In this method, a light pulse is transmitted down the optical fiber and the Rayleigh backscattered light resulting from the interaction of the light pulse with an inhomogeneity in the fiber is measured. The time delay between the incident light pulse and reflected light provides information on the location of the inhomogeneity. The amplitude of the backscatter light signal provides information on the degree of inhomogeneity. In conventional pulsed techniques, the measurement of the backscattered light becomes more difficult as spatial resolution is improved. Higher spatial resolution simultaneously results in lower levels of backscattered light power and increased noise power due to larger receiver bandwidths.

White light interferometry or optical low-coherence reflectometry provides a technique that allows several orders of magnitude improvement in both sensitivity and spatial resolution compared to conventional time domain methods. Spatial resolutions of 20 to 40 microns have been reported using this technique. This resolution is equivalent to the resolution that would be obtained using pulse widths of a few hundred femtoseconds using conventional pulse techniques. For these resolutions, the average backscattered levels for standard telecommunications fibers are of the order of −115 dB. Reflection sensitivities have been limited to values close to the backscattered levels due to the noise intensity of low-coherence optical sources. However, a reflection sensitivity of −136 dB has been demonstrated at a wavelength of 1.3 microns using a high-power superluminescent diode and a balanced detection scheme to minimize the effects of noise [Takada, et al., "Rayleigh Backscattering Measurements of Single-Mode Fibers by Low Coherence Optical Time-Domain Reflectometry With 14 $\mu$m Spatial Resolution", *Appl. Phys. Lett.*, 59, p. 143, 1991].

While low-coherence reflectometry provides the resolution and sensitivity to perform the measurements in question, the time needed can be prohibitive because of the low power levels in the backscattered light. To provide adequate signal to noise ratios, long signal averaging times are required. The resultant long measurement times are a major drawback to the use of this type of measurement system.

Broadly, it is an object of the present invention to provide an improved low-coherence reflectometry measurement apparatus and method.

It is a further object of the present invention to provide a low-coherence reflectometry system with substantially reduced measurement times compared to prior art low-coherence reflectometry systems.

These and other objects of the present invention will become apparent to those skilled in the art from the following detailed description of the invention and the accompanying drawings.

SUMMARY OF THE INVENTION

The present invention comprises an optical interferometer for measuring the optical properties of a device. The invention utilizes a optical amplifier comprising a diode-pumped superfluorescent fiber to provide a low-coherence light signal which is split into first and second light signals. A portion of said first light signal is applied to the device and the backscattered light generated thereby collected. The backscattered light is then amplified using an optical amplifier comprising a diode-pumped superfluorescent fiber before being mixed with the second light signal. In the preferred embodiment of the invention, the same diode-pumped superfluorescent fiber is used for both the low-coherence light source and the optical amplifier. The relative optical paths traveled by the second light signal and the backscattered light is varied using a moveable mirror. The rate of movement of the mirror or an optional phase shifting circuit may be used to generate a beat frequency to improve the detection of the coherently interfering signals in the adder.

DETAILED DESCRIPTION OF THE INVENTION

Figure 1:
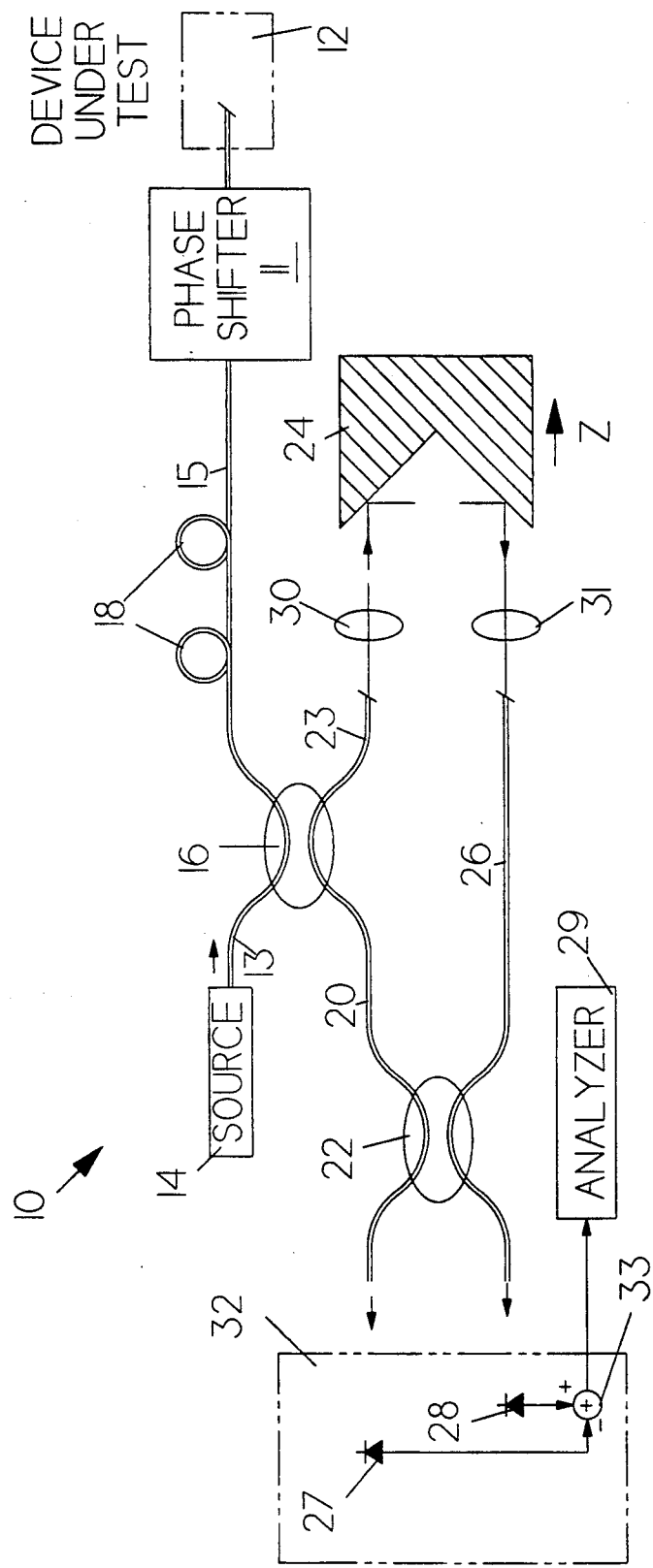
FIG. 1 is a block diagram of a low-coherence reflectometer.

The manner in which a low-coherence reflectometer operates may be more easily understood with reference to FIG. 1 which is a schematic diagram of a low-coherence reflectometer 10 for measuring the optical properties of a device 12. A low-coherence light source 14 is used to illuminate device 12. Optical coherence length of the light from light source 14 determines the spatial resolution of the measurements. A suitable light source may be constructed by utilizing the amplified spontaneous emission from an erbium-doped fiber. Such fibers are known to the optical arts and hence, will not be discussed in more detail here. Light from source 14 is split by coupler 16 which is connected to source 14 by fiber 13. Coupler 16 divides the light between two arms of the interferometer. The first arm comprising fiber 15 delivers light to device 12. The polarization of the light is controlled by two polarization control loops 18. An optional phase shifter may be included in this arm of the interferometer. The use of the phase shifter will be discussed in more detail below. Rayleigh backscattered light from device 12 is returned to coupler 16 via fiber 15. A portion of the backscattered light is delivered to a second coupler 22 via fiber 20.

The second arm of the interferometer has a variable time delay. The portion of the light from coupler 16 that is not routed down fiber 15 is routed to fiber 23 and provides a reference light signal. This light is imaged by lens 30 on a mirror 24 which is mounted on a moving stage. The motion in the Z direction alters the optical path length of the second arm of the interferometer. Light leaving mirror 24 is imaged into fiber 26 by lens 31 and delivered to coupler 22. Coupler 22 acts as an adder for combining the Rayleigh backscattered light from device 12 and the reference signal light from source 14. When the time delay from in the second arm of the interferometer matches the time delay of a reflection from device 12, coherent interference occurs producing a beat signal at a predetermined frequency. The power in the light signal at the beat frequency is detected by a balanced detector 32 comprising two photodiodes 27 and 28 and an adder 33. This power spectrum of the subtracted output is measured by a spectrum analyzer 29.

The beat frequency is preferably chosen to coincide with a minimum in the receiver noise floor. The frequency may be controlled by either of two methods. The preferred method uses phase shifter 11 which is sawtooth ramped over a range of 180 degrees producing a serrodyne frequency shift on the returning signal. In this case, the beat signal will be at the serrodyne frequency with a strength dependent on the magnitude of the reflection. In this type of system, mirror 24 is stepped through each position and the signal averaged for a sufficient time to provide the desired signal to noise. Alternatively, phase shifter 11 can be eliminated and mirror 24 moved in a continuous manner during the measurement. The continuous motion results in a Doppler shift in the frequency of the light in the second arm of the interferometer. The beat frequency will be at the Doppler shift frequency. Unfortunately, jitter in the mechanical stage limits the extent to which a narrow band Doppler frequency shift can be generated; hence, the first technique is preferred.

Couplers 16 and 22 are conventional fused couplers constructed by fusing two optical fibers together. Such couplers are conventional in the art, and hence, will not be discussed in more detail here.

While interferometer 10 provides sufficient signal to noise ratios for many measurements of interest, the time needed for signal averaging is substantial. Averaging times of more than one second per mirror position are required. These averaging times are a result of the low intensity of the backscattered light from device 12. The present invention avoids these long averaging times by including a light amplifier in the optical path between device 12 and coupler 22.

Figure 2:
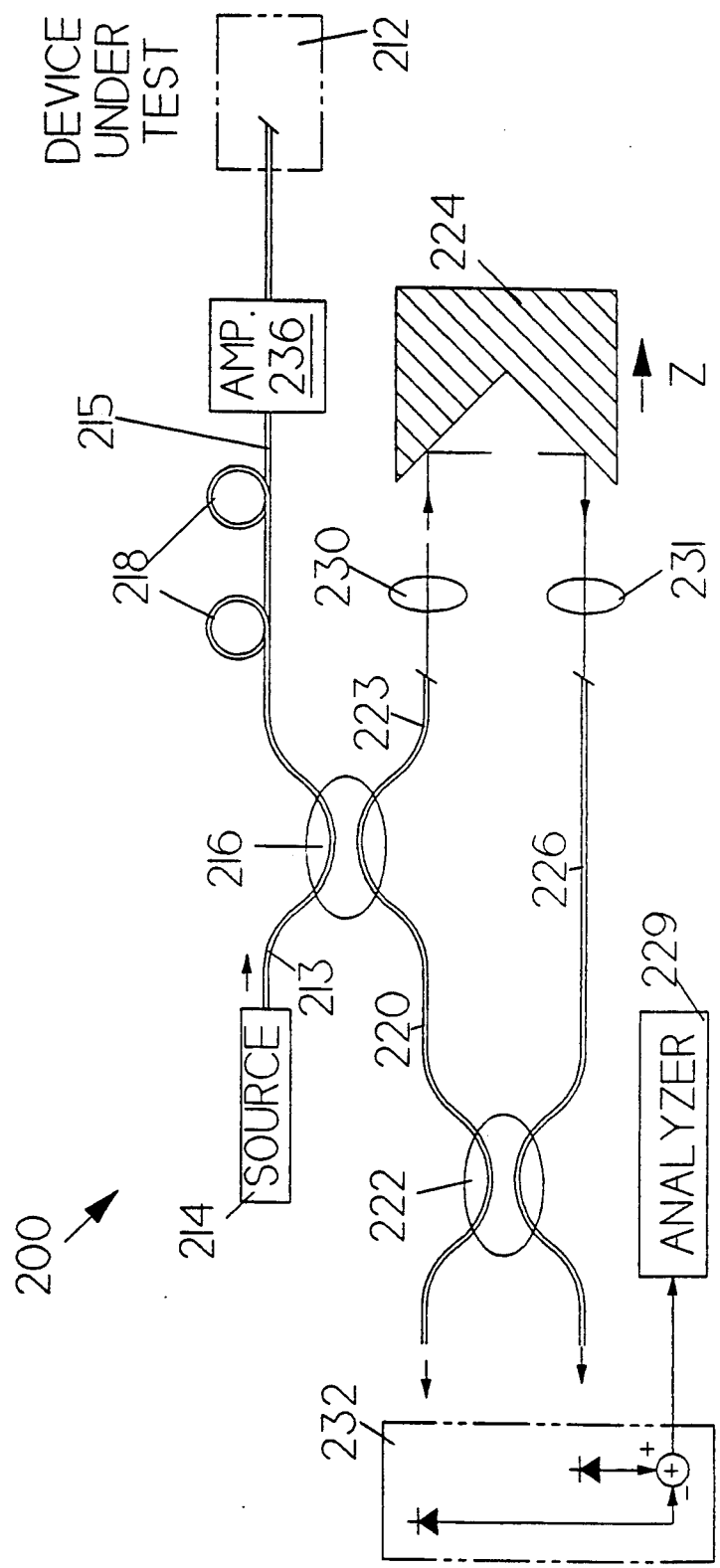
FIG. 2 is a block diagram of one embodiment of a low-coherence reflectometer according to the present invention.

The manner in which an optical amplifier may be introduced to reduce the averaging times is more easily understood with reference to FIG. 2 which is a block diagram of an interferometer 200 according to the present invention. Most of the components of interferometer 200 serve functions analogous to the components discussed above with reference to FIG. 1. Components serving analogous functions have been given reference numerals differing by 200 from the analogous components in FIG. 1. To reduce the complexity of the drawing, the phase shifter adjacent to the test device has been omitted; however, it is to be understood that a phase shifter may be included adjacent to the device under test to provide the beat frequency.

Interferometer 200 includes an optical amplifier 236 in fiber 215. Optical amplifier 236 amplifies the backscattered light from device 212 thereby increasing the magnitude of the backscattered light signal at coupler 222 by a factor related to the gain of amplifier 236. This reduces the averaging time by a factor equal to the gain of amplifier 236. For currently available optical amplifiers, this can result in a reduction of a factor of 100 in the measurement times.

Optical amplifier 236 is preferably constructed from a diode-pumped superfluorescent fiber source similar to source 214. Such amplifiers are constructed from rare-earth-doped optical fibers and have been used for amplifying signals in optical communication systems. For example, erbium-doped optical fibers are commonly used in this type of amplifier. This type of amplifier is well known in the optical arts, and hence, will not be discussed in detail here. A discussion of such amplifiers can be found in "High Power, Compact 1.48 $\mu$m Diode-Pumped Broadband Superfluorescent Fiber Source at 1.55 $\mu$m", Electronics Letters, 27, p. 261, 1991. In addition, semiconductor based optical amplifiers may also be used for amplifier 236.

While interferometer 200 is a substantial improvement over interferometer 10, the placement of the optical amplifier is less than optimum. Amplifier 236 also amplifies the incoming signal from source 214. This can lead to an incident light intensity which is sufficient to cause non-linear optical effects in the device under test. In addition, amplifier 236 represents an added cost to the system. It would clearly be advantageous to avoid this cost.

The cost of this additional component can be eliminated by placing the optical amplifier in one of the other optical paths through which the backscattered light passes and making use of the fact that the diode-pumped superfluorescent fiber source also produces a continuous low-coherence light signal. Hence, the optical amplifier can also be used to replace the light source thereby substantially reducing the extra cost of the component.

Figure 3:
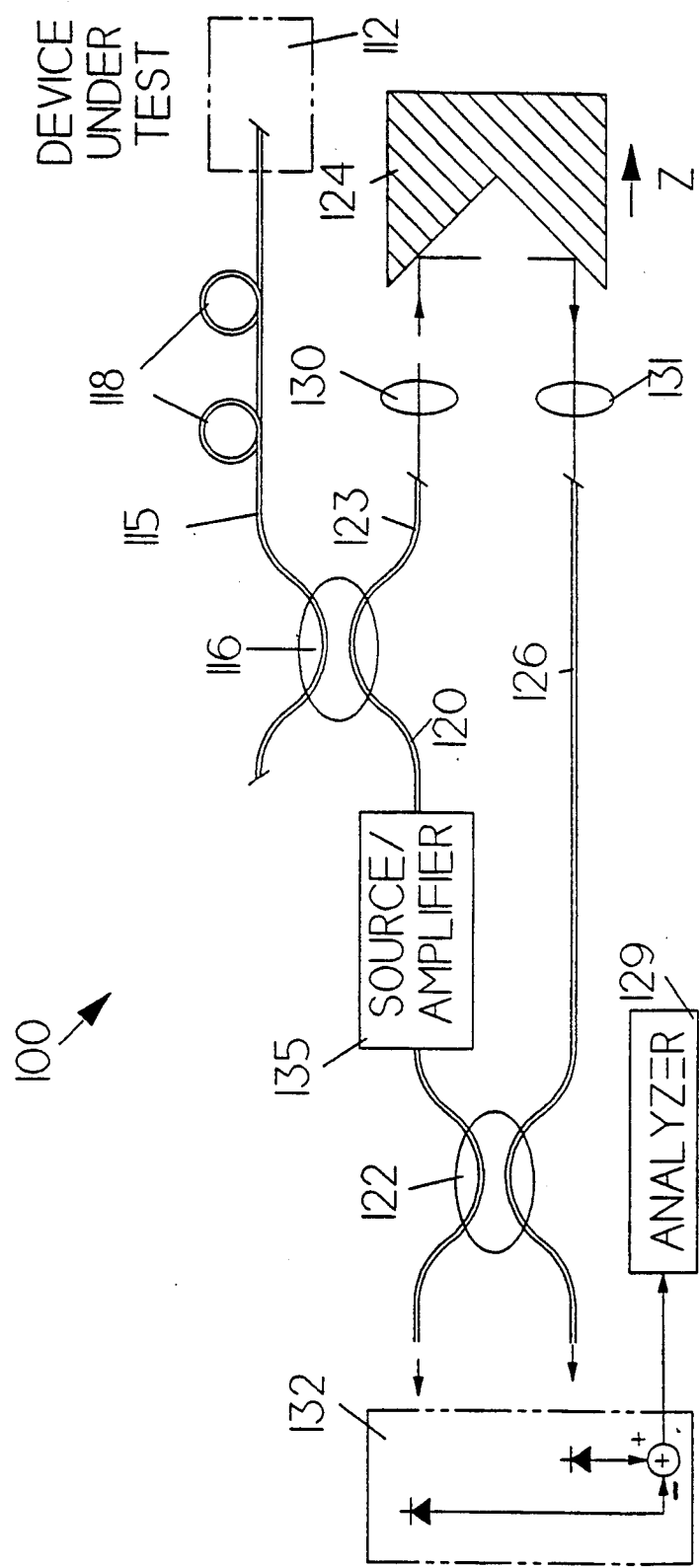
FIG. 3 is a block diagram of a second embodiment of a low-coherence reflectometer according to the present invention.

An interferometer using an alternative placement of the amplifier/light source is shown in FIG. 3 at 100. Once again, many of the components of interferometer 100 serve functions analogous to the components discussed above with reference to FIG. 1. Components serving analogous functions have been given reference numerals differing by 100 from the analogous components in FIG. 1. To reduce the complexity of the drawing, the phase shifter adjacent to the test device has been omitted; however, it is to be understood that a phase shifter may be included adjacent to the device under test to provide the beat frequency.

Interferometer 100 differs from interferometer 200 in that the optical amplifier/light source has been moved to a position between the beam splitting coupler 116 and the mixing coupler 122. The light emitted by amplifier 135 is split by coupler 116 into two beams. One beam is transmitted to device 112 by optical fiber 115, and the other beam is transmitted along the second arm of the interferometer comprising fiber 123 and moving mirror 124. The backscattered light from device 112 returns to amplifier 135 via fibers 115 and 120 through coupler 116. Amplifier 135 amplifies the backscattered light signal. The amplified signal is then combined with the reference light signal on fiber 126 by adder 122.

Figure 4:
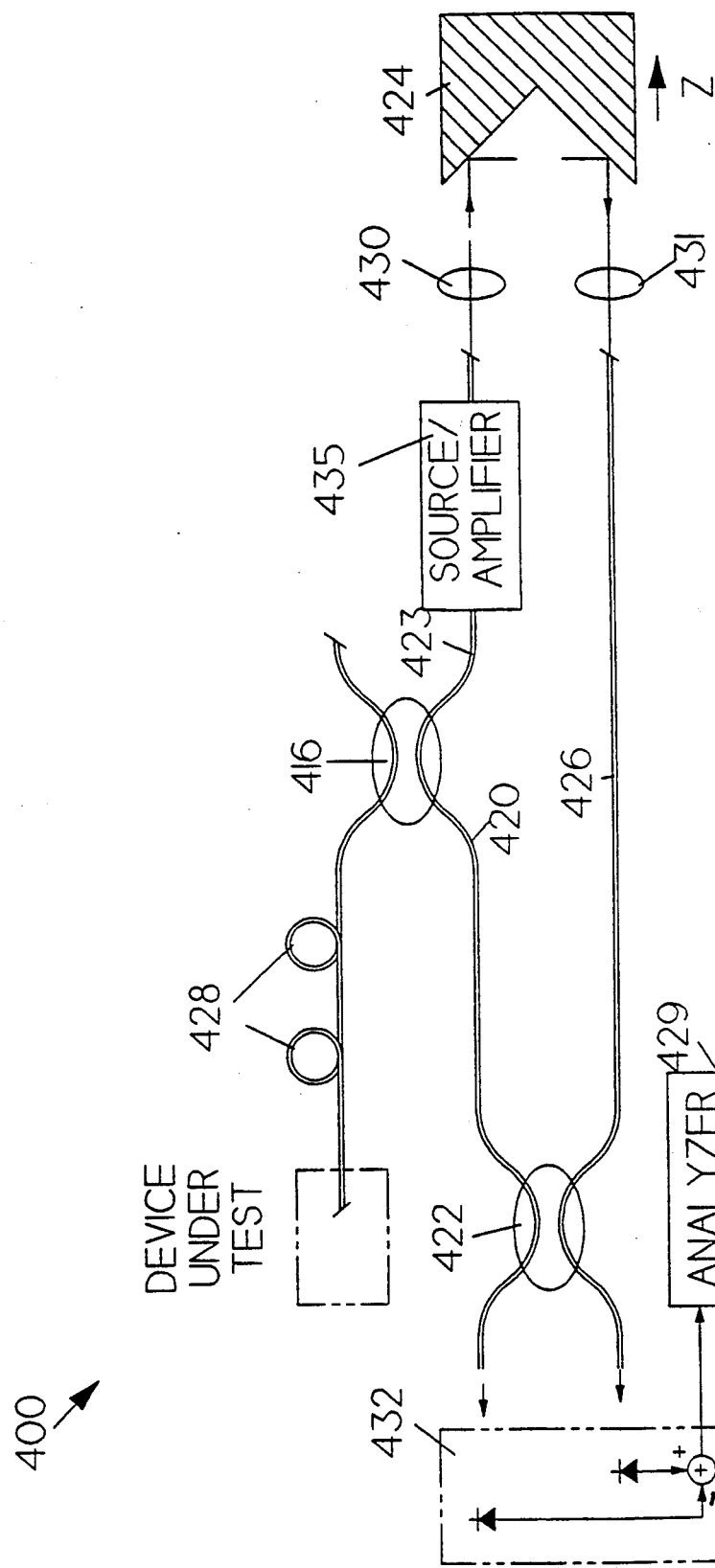
FIG. 4 is a block diagram of a third embodiment of a low-coherence reflectometer according to the present invention.
Figure 5:
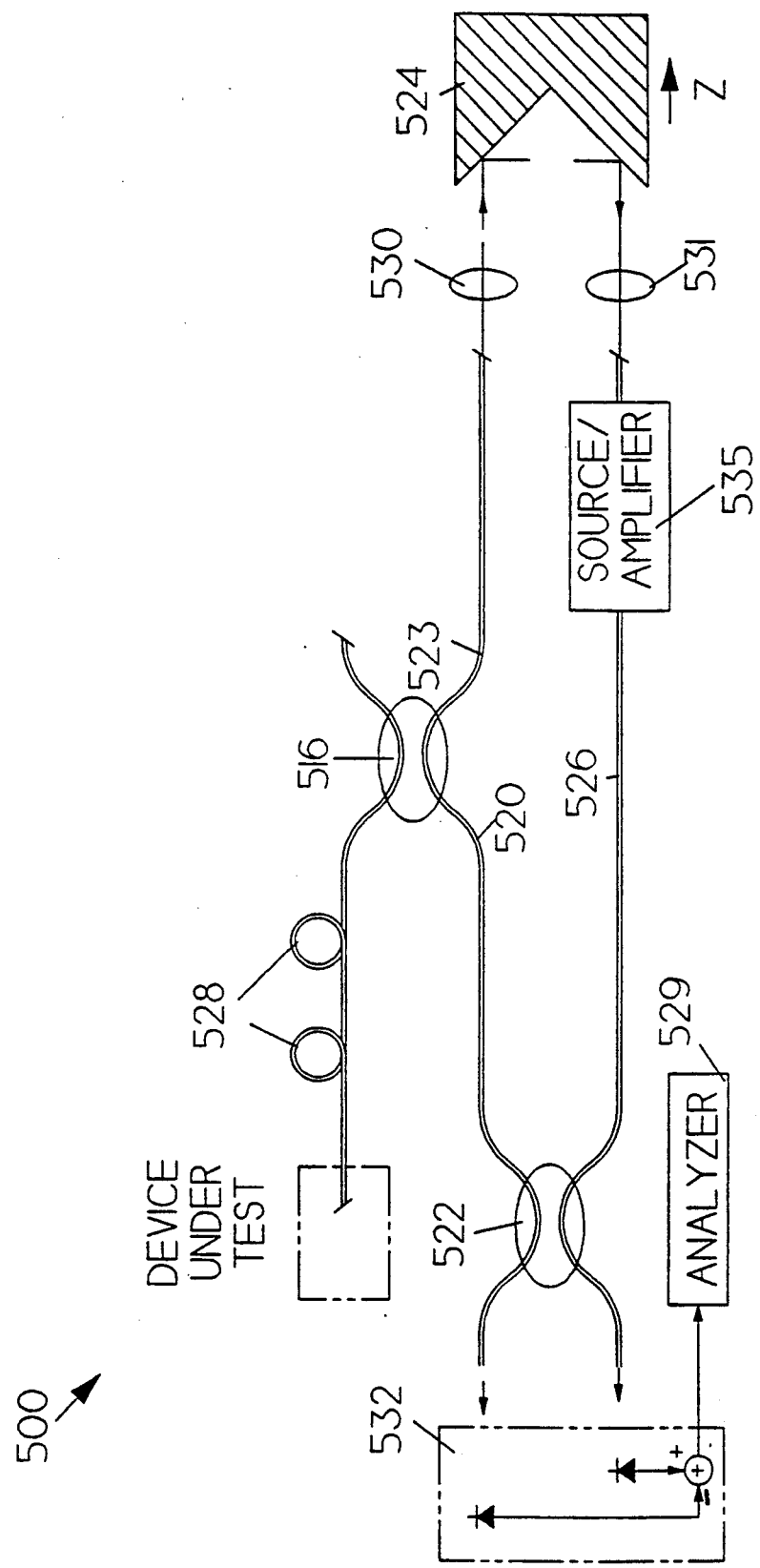
FIG. 5 is a block diagram of a fourth embodiment of a low-coherence reflectometer according to the present invention.

There are two other possible positions for the amplifier/light source which will also provide the advantages of reduced averaging times. These are shown in FIGS. 4 and 5 at 400 and 500, respectively. Once again, many of the components of interferometers 400 and 500 serve functions analogous to the components discussed above with reference to FIG. 1. Components serving analogous functions have been given reference numerals differing by 400 and 500, respectively, from the analogous components in FIG. 1. To reduce the complexity of the drawing, the phase shifter adjacent to the test device has been omitted; however, it is to be understood that a phase shifter may be included adjacent to the device under test to provide the beat frequency.

While all of the configurations shown in FIGS. 3-5 provide reduced averaging time, the configuration shown in FIG. 4 is preferred because it provides reduced noise compared to the other configurations. It should be noted that light is emitted from both ends of the amplifier light source. The light that does not leave in the direction of the device under test contributes to the noise in the detector (232, 332, and 432). The configuration shown in FIG. 4 is preferred because this noise light must reach adder 422 via moving mirror 424 and the optical system used for coupling the light signal back into fiber 426. This optical path has significant light losses; hence, the noise is reduced.

There has been described herein a low-coherence interferometer which provides reduced measurement times. Various modifications to the present invention will become apparent to those skilled in the art from the foregoing description and accompanying drawings. Accordingly, the present invention is to be limited solely by the scope of the following claims.

What is claimed is:

1. An optical interferometer for measuring the optical properties of a device, said interferometer comprising:
   source means for providing a low-coherence light signal;
   splitting means for dividing said low-coherence light signal into first and second light signals;
   means for applying a portion said first light signal to said device;
   adding means for combining light signals on first and second ports thereof to generate a combined light signal;
   detection means for measuring the amplitude of said combined light signal;
   means for collecting a portion of the backscattered light generated by the application of said first light signal to said device and for inputting a portion of said collected backscattered light to said first port of said adding means;
   means for inputting a portion of said second light signal to said second port of said adding means;
   means for varying the difference in the optical path lengths traveled by said backscattered light and said second light signal before entering said adding means; and
   optical amplification means for amplifying said portion of said collected backscattered light prior to said portion of said backscattered light entering said adding means such that the intensity of said backscattered light entering said adding means is increased relative to said second light signal.

2. The interferometer of claim 1 wherein said amplification means further comprises a light source which acts as said light source means.

3. The interferometer of claim 2 wherein said amplification means comprises a diode-pumped superfluorescent fiber.

4. The interferometer of claim 2 wherein said amplification means comprises a semiconductor-based optical amplifier.

5. The interferometer of claim 1 wherein said means for varying the difference in the optical path lengths traveled by said backscattered light and said second light signal before entering said adding means comprises a moveable mirror comprising a portion of the optical path between said adding means and said collecting means.

6. The interferometer of claim 5 wherein said collecting means includes said splitting means and wherein said amplification means is located between said splitting means and said moveable mirror.

* * * * *